Sept. 30, 1958  M. G. DREYFUS ET AL  2,854,349
LIGHT ALTERING MEANS AND METHOD OF MAKING THE SAME
Filed Sept. 20, 1954  3 Sheets-Sheet 1

INVENTORS
MARC G. DREYFUS
LEE O. UPTON
BY HELEN JUPNIK

ATTORNEY

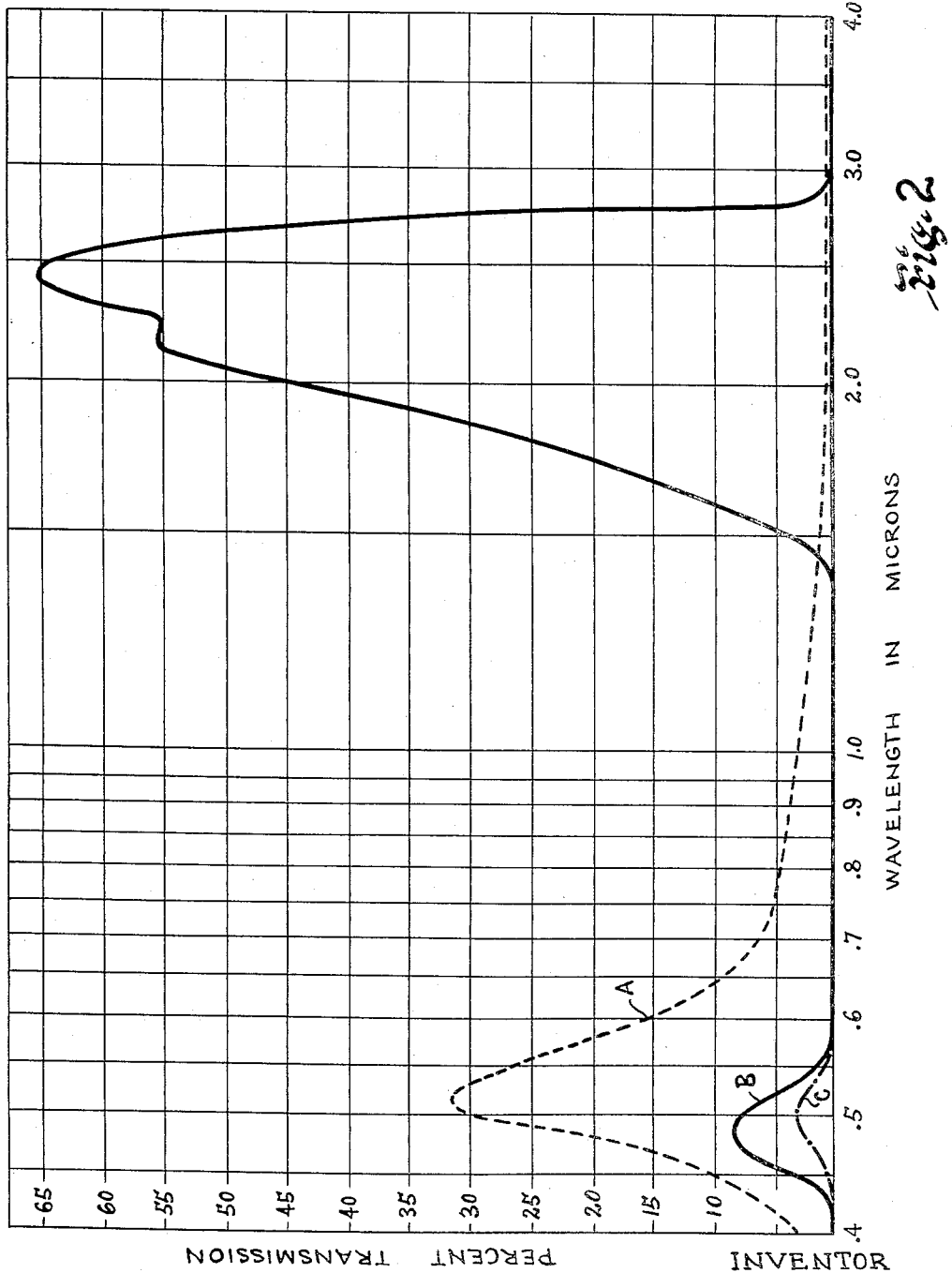

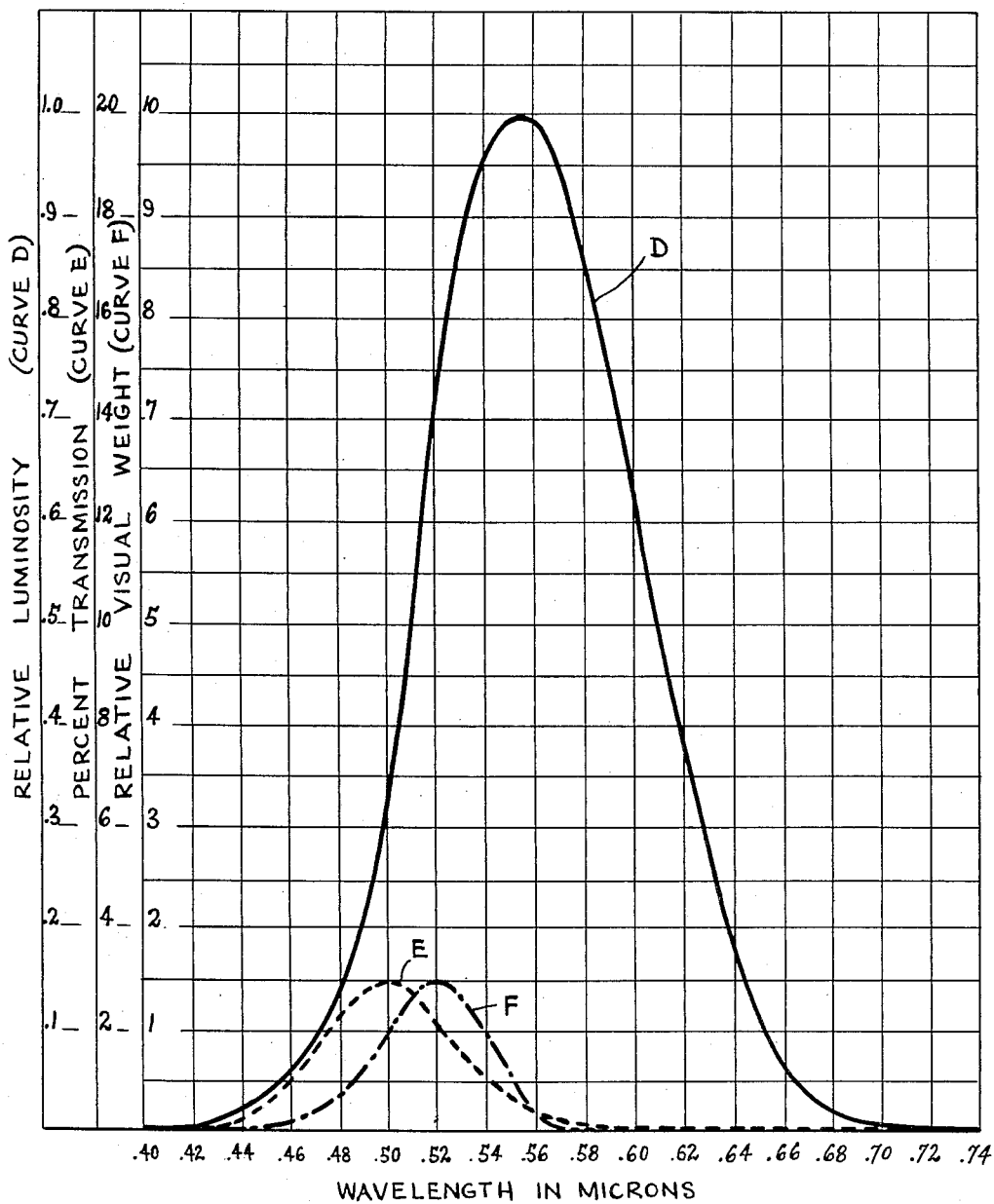

United States Patent Office 2,854,349
Patented Sept. 30, 1958

2,854,349

LIGHT ALTERING MEANS AND METHOD OF MAKING THE SAME

Marc G. Dreyfus, Southbridge, Lee O. Upton, Sturbridge, and Helen Jupnik, Southbridge, Mass., assignors to American Optical Company, Southbridge, Mass., a voluntary association of Massachusetts Application September 20, 1954, Serial No. 457,246

5 Claims. (Cl. 117—33.3)

The present invention relates to light altering devices and more particularly to welding plates, glasses and the like, useful in goggles, helmets and similar devices for controlling the transmission of light radiations to the wearer's eyes, and methods of making the same.

A principal object of the invention is to produce a welding plate which will selectively transmit wave lengths of light within a relatively narrow band of the visible part of the spectrum and will have substantially complete or near cutoff of wave lengths on either side of said selected band.

A further important object of the invention is to produce a welding plate characterized by its ability to transmit radiations of wave lengths between 480 and 550 millimicrons and which, when weighted by the sensitivity of the eye, has relatively little or no capacity for transmitting shorter or longer wave lengths.

A further important object of the invention is to produce an infrared and ultraviolet absorbing glass having selective transmission in the visible part of the spectrum with its peak between 4800 and 5500 angstroms.

A further important object of the invention is to produce such a welding plate, or provide such a glass, with a reflective surface capable of reflecting at least 50% and preferably 90% or better of the near infrared radiations so as to prevent undue discomfort to the user of such a plate or glass resulting from reradiation of heat energy absorbed by the plate or glass.

Another important object of the invention is to produce a welding plate that will be comfortable to view through and that will be of a color having little tendency to "pull" or strain the observer's eyes, particularly in argon or helium gas shielded aluminum, magnesium, and bronze welding.

A further object is to produce a coated welding plate wherein the reflectance and transmittance of the coating are so balanced with the transmittance of the plate as to be highly reflective in the infrared, highly absorptive in the ultraviolet and selectively transmitting in the visible region in accordance with the welding operation being viewed through the plate.

Another object is to produce such a coated welding plate wherein the major portion of its transmission is for wave lengths between 4800 and 5500 angstroms when weighted with the sensitivity of the human eye.

Another object is to produce such a coated welding plate which is provided with an infrared reflecting coating of a metal such as gold, copper, inconel or aluminum and the like.

A further object is to produce a glass having a transmission character within the visible region of the spectrum which when coated with an infrared reflecting metal coating such as gold or copper will so balance the visible transmission characteristics of said coating as to have the major portion of its transmission lying within the narrow band of .480 and .550 micron.

A further object is to produce such a glass wherein it comprises a phosphate base to which has been added copper oxide and molybdenum oxide or cobalt oxide as colorants and in controlled proportions to obtain said transmission characteristics when weighted by the sensitivity of the human eye and in accordance with the density shade desired.

A further object is to provide a means for protecting and/or bonding a highly infrared reflecting coating of gold or copper to such a glass which will not materially interfere with the functions thereof.

A further object is to provide a protective layer for the gold or copper coating which will transmit in the visible and reflect in the infrared regions so as not to materially detract from, and preferably enhance, the ability of the coated article to highly reflect in the infrared, absorb in the ultraviolet and selectively transmit in the visible region of the spectrum.

Another important object of the invention is to provide simple, economical but efficient means and methods of producing such a glass and of applying the metal coating as well as the bonding and protective layers so that the most efficient result may be obtained in a satisfactory, convenient and economical manner.

Many other objects as well as advantages to be gained from the invention will be pointed out and will become apparent from the description of the invention to follow. It is to be further understood that said description is not to be taken in any limiting sense but more as illustrative of how the invention may be practiced within the limits as defined by the accompanying claims.

Referring to the drawings:

Fig. 2 illustrates the transmission characteristics of the glass alone, of the coating alone and of the coated article;

Fig. 4 illustrates the transmission characteristics of the coated article in the visible region as compared with the sensitivity of the normal human eye for such radiations.

Figure 1:
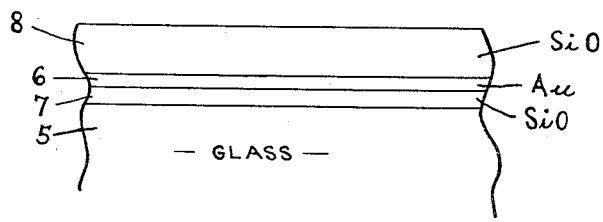
Fig. 1 illustrates in diagrammatic form a coated article which is the preferred form which the invention takes.

Welding plates as presently known to the art are usually formed of glasses having their compositions controlled to provide substantial amounts of absorption in the infrared and ultraviolet regions of the spectrum and which also contain colorants in amounts sufficient to keep the visible transmission of the glass within specified shades or densities in accordance with the intensity of the welding arc. Such glasses are generally acceptable for most welding purposes. However, complaints of eye discomfort and unsatisfactory vision have persisted from welders utilizing helium or argon gas shielded arcs with aluminum or magnesium aluminum work and viewing such work for long sustained periods of time. The complaints are typically that the welder's eyes become irritated after several hours' welding, even when using protective glasses several shades denser than indicated necessary by the amperage and visible radiation of the welding arc used. They also complain of a yellow flare light present in the arc or a blue haze or mist surrounding the work which obscures the view of the welding operation. Addition of a supplementary infrared absorbing filter did not solve the eye discomfort problem and the addition of a supplementary didymium filter did not solve the visibility problem. It therefore became a principal object of this invention to improve upon and overcome these problems and deficiencies of prior art type welding plates.

Cross section spectrograms indicate a pattern of visible radiations in the form of an outer cloud radiating spectral lines characteristic of its component gases surrounding the incandescent stream and pool of molten metal at the point of welding. Although the welding glasses tested had a relatively dark shade or low transmission in the visible region of the spectrum in accordance with the Federal Specifications for welding glasses, they were still transmitting sufficient amounts of these spectral lines emitted by the gaseous clouds to impair vision of the arc stream and molten metal. Spectrographic analysis revealed that these spectral emission lines covered most of the range of the visible spectrum except for a gap between .48 and .55 of a micron in the blue-green region of the spectrum and with slight amounts of emission between .55 and .58 of a micron. The analysis showed that the enveloping gaseous cloud was relatively rich in the orange region (.58 to .62 of a micron) on one side of this gap and in the blue region (.43 to .47 of a micron) on the other side. There were a few isolated emission lines in the blue-green (.5165 to .5185 of a micron). Thus it was desirable that a welding plate not only have controlled density in the visible spectrum but that its transmission be selective. By controlling the transmission peak of the glass to lie within said gap (.48 to .55 of a micron) and to have a sufficiently sharp cutoff on either side of said peak to avoid substantial amounts of transmission in the orange and blue regions referred to above, the molten weld pool and hot electrode tip of the welder's tool is readily visible through the enveloping cloud. Such a welding glass is herein described.

The electrical power consumption of argon and helium-shielded arcs is typically 1000 to 10,000 watts and it was found that although the prior art dark glasses had sufficient absorption to afford ample protection against transmitted infrared radiation, the intensity of the heat generated by the arc was such that this absorption by the glass was sufficiently large that it caused enough secondary radiation to be emitted to the eye to account for the discomfort complained of after sustained use of the welding plates for several hours.

Although this problem of reradiation might be attacked in different ways, an efficient solution would be to reflect the infarared radiations rather than allowing them to be absorbed by the glass. This would be attacking the problem of reradiation directly at the source.

Figure 3:
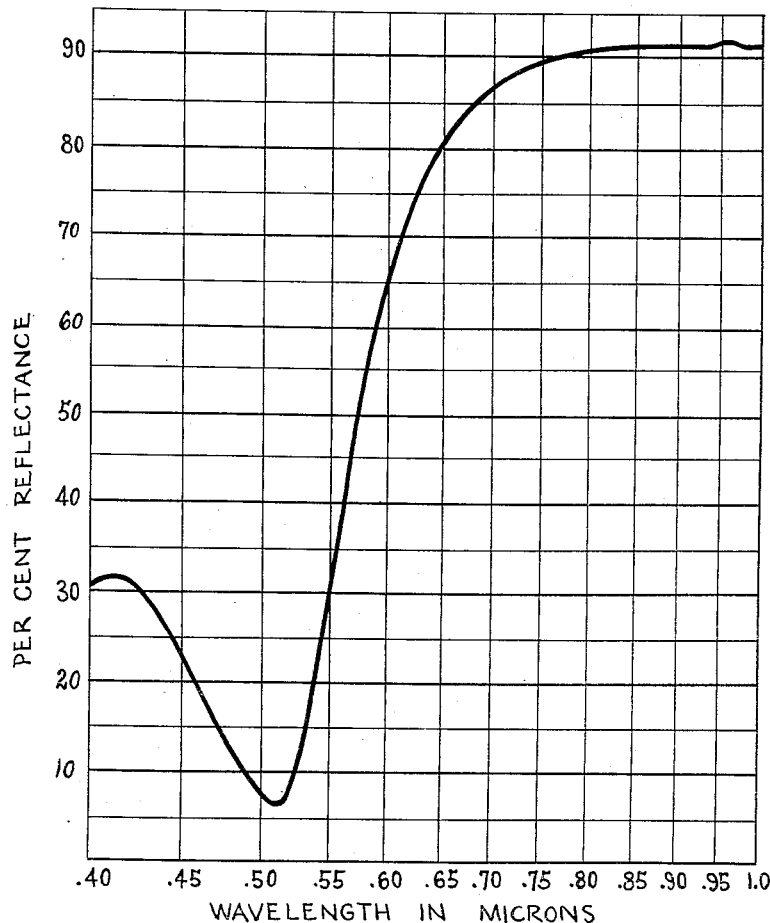
Fig. 3 illustrates the reflective characteristics of the coated article as when related to magnesium carbonate which is a standard and conventional way of measuring reflectance.

Many of the metals when applied as a thin coating to glass have good reflecting properties. For example, a piece of ordinary crown glass may be coated in vacuum with a layer of gold to a thickness monitored by its visible transmission to have a desired high reflectivity of infrared radiations. An example of the reflectivity curve of gold when monitored to have a transmission of about 20% at a selected radiation in the visible spectrum is seen in Fig. 3. Gold at this thickness, which is roughly 500 angstroms, physically speaking, makes an excellent infrared radiation reflector since it will reflect 90% or better of infrared radiations of wave lengths of .75 to 3.0 microns and longer while its reflection sharply cuts off as it enters the visible region. It has a minimum reflectance in the pertinent band of the region where high visible transmission is desired. The fact that it again rises in the blue as it exits into the ultraviolet region of the spectrum is also advantageous since low transmission is desired for wave lengths shorter than .48 micron.

In order to get a similar infrared reflectance using copper, a thicker coating needs to be applied. This results in lower transmission values in the visible region. Not only does the copper have less infrared absorption than gold for the same visible transmission but it likewise is not as desirable since it is softer and will not withstand as well normal abuse generally given welding plates in use. It, however, is useful. Other metals having at least 50% reflectance could be made to work satisfactorily since 50% reflectance does not mean that 50% of the radiations are being transmitted. There is also a substantial amount of absorption by the metal. Examples are Inconel and aluminum. Both gold and copper reflect better than 90% of the infrared radiations so as to have very low transmission in the infrared region. Note the transmission curve A of gold as seen in Fig. 2. Note how the transmission of the gold coated crown glass peaks around 5200 angstroms, or .52 of a micron, and with fairly sharp cutoff on either side so that it is in the gap in the spectral emission of the arc. Copper peaks at .58 of a micron and is thus not as desirable for cutting out the orange part of the spectrum. Metals such as aluminum have a substantially flat transmission curve in the visible region and thus are of little value as far as helping the visible transmission, although as mentioned previously they do have substantial reflectance in the infrared and are therefore valuable.

Referring again to Figure 2, it will be seen that although the gold coating has its peak transmission within the mentioned gap of .48 to .55 of a micron in the radiation spectrum of the welding arc, and with rapidly decreasing amounts of transmission for wave lengths on either side thereof, it still transmits relatively large amounts in the critical orange and blue regions. It also has substantial transmission in the near ultra violet. For example, with a peak transmission of 32%, at .55 of a micron the gold transmits better than 25% and at .58 of a micron it transmits 20%. On the opposed side of its peak transmission, at .48 of a micron it is transmitting between 20 and 25%.

In Fig. 4, curve D has been plotted to show the relative sensitivity of the human eye for different wave lengths of light in the visible part of the spectrum. Thus it has its greatest sensitivity for wave lengths between .55 and .56 of a micron while at .50 of a micron its sensitivity is roughly 30% of its peak sensitivity. Therefore, when weighted by the sensitivity of the human eye, the transmission of the gold coated crown for radiations of .58 of a micron and longer becomes even more significant. Not only does the eye have considerable sensitivity for radiations in this region but these radiations are those contributing most to the discomfort and poor visibility in viewing the welding operation. The relatively high transmission of the gold for wave lengths of .43 to .47 of a micron on the other side of its peak transmission is not as critical since the sensitivity of the eye in this region is relatively poor as may be seen from a study of Fig. 4. Since copper has its peak transmission at .58 of a micron which is close to the sodium line, it is poorer than the gold.

Colorants could be added to the crown glass in controlled proportionate amounts so as to obtain a shifting of the peak transmission of the gold or copper to the left of the figure somewhat. Thus when weighted by the sensitivity of the eye the major portion of its visible transmission would lie substantially within said gap between .48 and .55 of a micron. Some ultra-violet absorbent would also have to be added to the crown glass composition.

Referring to Fig. 1 wherein there is represented a welding plate formed according to the present invention, a preferred composition for the glass layer 5 on which the gold layer 6 is applied would comprise the following ingredients and proportions by weight on a percentage basis:

Phosphorus pentoxide ($P_2O_5$) _____ 63.99
Aluminum oxide ($Al_2O_3$) _____ 9.14
Zinc oxide (ZnO) _____ 18.28
Copper oxide (CuO) _____ 3.54
Molybdenum oxide ($MoO_3$) _____ 5.05

This batch composition when melted will produce a glass (at 3.0 mm. thickness) having a transmission curve as indicated at B in Fig. 2 with a density of color of about shade #6 according to the Federal Specifications of welding shades and which when coated with the gold is lowered to about shade #7. The phosphorous pentoxide, aluminum oxide and zinc oxide constitute the base glass to which the colorants are added to introduce the desired peak of transmission and desired infrared and ultra-violet absorption characteristics. In the absence of the copper oxide and molybdenum oxide, it is substantially colorless.

The base glass preferably comprises 70% by weight of phosphorus pentoxide, 10% aluminum oxide and 20% zinc oxide, although the phosphorus pentoxide may be varied between 65% and 75% and the zinc oxide between 15% and 25%. More or less than the recited 10% aluminum oxide tends to yield glasses which although clear and easily fined exhibit greater tendency toward devitrification and reworking difficulty.

Such glasses are preferred to the silicate base glasses owing to the fact that a much narrower or sharper spectral band pass is permitted which produces purer and sharper colors. The glasses as compounded have excellent fining properties without the addition of other fining agents and no difficulty was experienced with bubbles or pot attack. The ingredients are prefrably melted in silicate pots at approximately 2600° F. from chemical compounds which will yield the desired oxide composition. The temperatures is then reduced to between 2000 and 2100° F. which has been found to be a suitable casting temperature for these glass melts. The addition of alkalis such as sodium, potassium and lithium is to be avoided because of the increased tendency of the glasses to devitrify. The alkalis also give rise to excessive volatilization which affects the density and color stability.

The copper oxide and molybdenum oxide are added to the base glass to give the desired color and sharp absorption on either side of the selected transmission. Pure molybdenum oxide has a transmission peak at about 4700 angstroms or .47 of a micron while pure copper oxide has a transmission peak at 5400 angstroms or .54 of a micron. By varying the proportion of copper oxide to molybdenum oxide the transmission peak of the resultant glass can be varied between these extremes. It was found that by using the proportion of 7 to 10, that is 7 parts copper oxide to 10 parts molybdenum oxide, a peak transmission at about 4850 angstroms could be obtained which proved the most satisfactory when the glass was coated with the gold. If some other metal were being used to reflect the infrared rays, a different ratio of copper oxide to molybdenum oxide might, of course, be selected to obtain the desired selective transmission of the final coated plate.

Varying the total amount of copper oxide and molybdenum oxide added to the base glass composition permits control of the welding shade desired. An example of a glass having about a shade #8 for a 3.0 mm. thickness and which will produce when combined with the gold coating 6 about a shade #9 has the following composition by weight on a percentage basis:

| | |
|---|---|
| Phosphorous pentoxide ($P_2O_5$) | 62.72 |
| Aluminum oxide ($Al_2O_3$) | 8.96 |
| Zinc oxide (ZnO) | 17.92 |
| Copper oxide (CuO) | 4.28 |
| Molybdenum oxide ($MoO_3$) | 6.12 |

Increasing the molybdenum oxide-copper oxide concentration will, of course, result in lower transmission and higher shade numbers. For example, 60 parts of molybdenum oxide and 42 parts of copper oxide in 502 parts total batch produced welding plates darker than shade #30. The molybdenum oxide and copper oxide can be added to the base glass so that the molybdenum oxide comprises 80 parts and the copper oxide comprises 56 parts in a total batch of 536 parts before the limits of solubility are reached, but this, of course, will produce color shades considerably more dense than anything required presently. At the other extreme the proportion of molybdenum oxide and copper oxide could be reduced to zero. However, without these ingredients, the base glass would be transparent and without color. The density of welding plates are, however, generally varied between shades #5 and #14. A glass of about shade #5 is obtained by adding 19 parts of molybdenum oxide and 13.3 parts of copper oxide to 400 parts of the base glass while a glass of about shade #14 is obtained by increasing the molybdenum oxide content to 37.3 parts and the copper oxide to 26.1 parts. Shades in between will be obtained by proportionately varying the total amount of colorants in their correct ratio.

Although the copper oxide and molybdenum oxide combination is to be preferred the molybdenum oxide may be replaced in whole or in part by cobalt oxide. The cobalt oxide-copper oxide combination, however, permits a slightly broader band pass of wave lengths in the visible spectrum. The copper oxide appears to be essential in that it absorbs a large part of the infrared and ultraviolet as well as helps to establish the visible blue color. By itself, copper has its peak transmission in the green but when combined with the cobalt oxide or molybdenum oxide, the transmission peak may be properly located.

Cobalt oxide is a more powerful colorant than either the copper oxide or the molybdenum oxide the preferred ratio being 4 parts of cobalt oxide to 10 parts of copper oxide when gold is used as the infrared reflecting layer. This compares with the preferred ratio of 10 parts molybdenum oxide to 7 parts copper oxide. A glass composition comprising roughly 400 parts of base glass to which has been added 8 parts of cobalt oxide and 20 parts of copper oxide will produce a glass having a transmission curve roughly approaching that illustrated by curve B in Fig. 2 except for a somewhat lower peak transmission.

As may be seen from curve C of Fig. 2, the preferred coated welding glass containing copper oxide and molybdenum oxide in amounts as described previously to obtain shade No. 6, and when of a thickness of about 3.0 mm. transmits in the order of a few tenths of a percent in the infrared region. The glass alone transmits less than 1% at .58 of a micron (curve B in Fig. 2) while the coated glass is substantially opaque at this wave length. Although the glass as seen from its transmission curve B has a transmission band between roughly 1.5 and 3.0 microns in the infrared region, it does not transmit highly elsewhere in the infrared out to 7.0 microns. However, the gold layer 6 applied to the outer surface of the glass compensates for this infrared transmission band of the glass by reason of its high reflectance throughout the entire infrared region. The result is that the coated plate has substantially no transmittance for wave lengths longer than .58 of a micron. For wave lengths shorter than .42 of a micron the transmission of the coated plate is likewise substantially at or near zero so that a welding plate is provided which cuts off substantially all the infrared and ultraviolet radiations. Moreover, since the gold reflects better than 90% of the infrared radiations, there is no problem of re-radiation and the resultant discomfort to the welder after prolonged use of the plate. Thus, the coated glass with a visible peak transmission of roughly 3% or less will have a transmission curve which runs practically along the zero line for the whole length of the spectrum except for a selective peak in the visible spectrum between .42 and .58 of a micron.

Although the transmission of the coated plate in the visible region is somewhat wider than the gap in the emission spectrum of the welding arc (.48 to .55 of a micron) its peak transmission at .5 micron is such that when weighted by the sensitivity of the eye the major portion of said visible transmission is within said gap.

Note in this respect Fig. 4 wherein E represents the transmission of the coated glass and F its transmission when weighted with the sensitivity of the eye for said wave lengths. Curve F is the product obtained by multiplying the values of curves D and E.

As will be seen from curve D, the human eye is highly sensitive to light of 5800–6200 angstroms wave length which is present in large quantities in the spectral emission of helium or argon gas shielded aluminum and/or magnesium welding. The glass alone, however, as mentioned above, is highly absorptive in this region and when coupled with the gold coat is even more absorptive here. By comparison, the transmission of the coated glass at 5000 angstroms when weighted with the sensitivity of the eye is substantially 50 times its transmission at the sodium line 5893 angstroms. Although this is sufficient to remove the problem of the yellow glare, if desired, the differential in absorption at the sodium line and the peak transmission of the coated plate may be further increased by the addition of small amounts of neodymium to the glass composition.

It is to be understood that for some limited purposes the glass might be useful without the gold coating. Although the glass does have the mentioned relatively large transmission of infrared radiations between 1.5 and 3.0 microns in wave length, this is beyond the most critical infrared region for eye damage of 0.75 to 1.4 microns. Research carried on as a part of the present invention has indicated that the eye is substantially opaque to and tends to absorb infrared radiations longer than 1.4 microns. However, absorption by the eye of these longer radiations in quantity will introduce the mentioned discomfort to the eyes. Therefore, the metal coated welding plates are to be preferred for the reasons previously discussed.

Experience in working with the glasses above discussed and coating them with the gold and other metals indicates that the gold layer, as well as the copper, needs a certain amount of protection in order to make it completely satisfactory. It is therefore preferable that a binder layer 7 of silicon monoxide (SiO) be first applied to the surface of the glass. An optical thickness of roughly a quarter wave length of visible light seems to work best both to cause the gold layer to adhere more strongly to the glass surface, and also because this thickness provides the silicon monoxide with the properties of a low reflection coating, to enhance the transmission of the glass within the visible region slightly.

It was also found preferable to apply an outer protective coating 8 of the silicon monoxide over the gold layer 6. In this case, it was found preferable to apply the silicon monoxide to an optical thickness of at least three-quarters of a wave length of the visible light to give the required physical protection. A quarter wave length thickness of silicon monoxide was satisfactory optically but provided less resistance to abrasion than three-quarter wave length. Obviously other multiples of quarter wave lengths of optical thicknesses might have been used so as to simultaneously serve to enhance the transmission of the visible rediations through the coated article. However, it is also desirable that its thickness be held to a substantially even multiple of a quarter wave length of the optical thickness of radiations in the infrared region of the spectrum so as not to interfere with the infrared-radiation-reflecting property of the gold coating. Therefore, although five-quarters or seven-quarters would have given the desired protection to the gold coating and increased its transmission in the visible region by reducing reflection, the best compromise between increased transmission in the visible and a neutral effect on the reflectance of the gold coating in the infrared region was the three-quarter wave length SiO coating thickness. The thickness of the undercoating of silicon monoxide is so negligible in its optical effect in the infrared region that it has essentially no effect upon this part of the spectrum.

The use of silicon monoxide as a binder and as a protective coating was indicated because of the ease of application, particularly when its blue absorption was beneficial rather than detrimental. However, other materials such as magnesium fluoride ($MgF_2$), thorium oxyfluorides ($ThOF_2$) and metallic oxides would be suitable.

The silicon monoxide coatings also absorb somewhat in the ultraviolet region. The greater part of the ultraviolet absorption of the coated welding plate is however obtained by the colorants added to the glass. This is apparent from a study of curve B.

It is to be understood that the transmission curve as illustrated by A is of a gold coated crown glass plate having a three-quarter wave length outer protective layer and a quarter wave length inner or binder layer of said silicon monoxide while curve C indicates the transmission of the coated article wherein the crown glass has been replaced by a phosphate glass containing the specified molybdenum oxide-copper oxide ratio discussed above. Fig. 3 shows the reflectance of the glass having the transmission curve indicated by C in Fig. 2. It is to be understood that the reflectance of the coated glass lies above 90% for radiations longer than 1.0 micron. Experiments and tests indicated that the transmission of the coated glass as far out as 7.0 microns was negligibly small and likewise its reflectance was above 90% out to 7.0 microns.

In applying the silicon monoxide coatings, it has been found desirable to evaporate the silicon monoxide very rapidly and to heat the substrate to about 200° C. before and during all coatings. Preferably a quarter wave length thickness is applied in from 20 to 30 seconds. This helps to increase the ability of the coatings to absorb in the blue and ultraviolet region as well as to produce a harder protective or binding film. The coatings of silicon monoxide and gold are preferably applied in the same bell jar following more or less conventional techniques. The metal should also be evaporated very rapidly (5% transmission of gold in 5 seconds).

A more economical coating could be obtained by employing a mixed coating of inconel and gold, but at the sacrifice of some of the blue-green transmission of the gold. The Inconel could be applied as a first layer over which the gold could be applied. Alternatively, inconel or titanium metal could be applied as a first coat, then blended with gold, the evaporation being completed with a pure gold outer surface, using enough gold over the inconel to give the desired 90% reflectance. In this case, the under layer of silicon monoxide could be avoided because the inconel and titanium metal themselves adhere tenaciously to glass surfaces. It is, however, desirable to use the three-quarter wave length thickness overcoating of silicon monoxide to protect the gold surface.

From the foregoing description, it will be apparent that simple, efficient and economical means and methods have been provided for accomplishing all of the objects and advantages of the invention.

Having described the invention, what is claimed as novel and patentable is:

1. Glass welding plates ranging in shades from No. 5 to No. 14 for a thickness of approximately 3.0 millimeters whose related proportions of ingredients are substantially equivalent to the combining with 400 parts of a phosphate base glass from 19 to 37.3 parts molybdenum oxide and from 13.3 to 26.1 parts copper oxide, said base glass comprising phosphorous pentoxide from 62.72 to 75%, aluminum oxide from 8.96 to 10% and zinc oxide from 15 to 25%, said glass plate having a peak transmission in the visible spectrum between 480 and 550 millimicrons and a layer of gold of a controlled thickness to give approximately 20% transmission in the visible region of the spectrum and at least 90% reflection in the infra-red region of the spectrum bonded to one surface of said glass plate.

2. Glass welding plates ranging in shades from No. 5 to No. 14 for a thickness of approximately 3.0 millimeters whose related proportions of ingredients are substantially equivalent to the combining with 400 parts of a phosphate base glass from 19 to 37.3 parts molybdenum oxide and from 13.3 to 26.1 parts copper oxide, said base glass comprising phosphorous pentoxide from 62.72 to 75%, aluminum oxide from 8.96 to 10% and zinc oxide from 15 to 25%, said glass plate having a peak transmission in the visible spectrum between 480 and 550 millimicrons and a layer of gold of a controlled thickness to give approximately 20% transmission in the visible region of the spectrum and at least 90% reflection in the infra-red region of the spectrum bonded to one surface of said glass plate, said gold layer being bonded to said glass plate by an intermediate coating of silicon monoxide of an optical thickness of approximately a quarter wave length of visible light.

3. Glass welding plates ranging in shades from No. 5 to No. 14 for a thickness of approximately 3.0 millimeters whose related proportions of ingredients are substantially equivalent to the combining with 400 parts of a phosphate base glass from 19 to 37.3 parts molybdenum oxide and from 13.3 to 26.1 parts copper oxide, said base glass comprising phosphorus pentoxide from 62.72 to 75%, aluminum oxide from 8.96 to 10% and zinc oxide from 15 to 25%, said glass plate having a peak transmission in the visible spectrum between 480 and 550 millimicrons and a layer of gold of a controlled thickness to give approximately 20% transmission in the visible region of the spectrum and at least 90% reflection in the infra-red region of the spectrum bonded to one surface of said glass plate, said gold layer being bonded to said glass plate by an intermediate coating of silicon monoxide of an optical thickness of approximately a quarter wave length of visible light, and having an outer layer of silicon monoxide thereon of an optical thickness of at least three-quarters of a wave length of visible light.

4. A welding plate as set forth in claim 1 having a peak transmission in the visible spectrum between .48 and .55 micron and a layer of gold bonded to one surface of said glass plate and being of a thickness sufficient to reflect at least 90% of radiations in the infrared region longer than .7 of a micron and to permit transmission of visible radiations of wave lengths between .48 and .55 of a micron.

5. The method of forming glass welding plates for use in viewing welding arcs of high heat intensity such as in argon and helium gas shielded aluminum and magnesium work and which have strong spectral emission lines except for wave lengths between .48 and .55 of a micron comprising combining ingredients whose related proportions are substantially equivalent to 400 parts of a phosphate base glass, from 19 to 37.3 parts molybdenum oxide and from 13.3 to 26.1 parts copper oxide to cause said resultant plate to have a peak transmission in the visible spectrum between 480 and 550 millimicrons and to have relatively low transmission in regions on either side of said peak and which extend into the ultraviolet and infrared regions respectively of the spectrum, said phosphate base glass comprising phosphorous pentoxide from 62.72 to 75%, aluminum oxide from 8.96 to 10% and zinc oxide from 15 to 25%, and bonding a layer of gold to one surface of said glass plate and controlling the thickness of said layer to give approximately 20% transmission in the visible region of the spectrum and so that it has at least 90% reflection for infrared radiations of wave lengths longer than .7 of a micron and will transmit visible radiations of wave lengths between .48 and .55 of a micron.

References Cited in the file of this patent

UNITED STATES PATENTS

| | | |
|---|---|---|
| 1,176,313 | Pfund | Mar. 21, 1916 |
| 1,222,049 | Tillyer | Apr. 10, 1917 |
| 1,434,268 | Tillyer | Oct. 31, 1922 |
| 1,750,197 | Schoen | Mar. 11, 1930 |
| 1,951,213 | Schlumbohn | Mar. 13, 1934 |
| 2,087,802 | Bayer-Krucsay | July 20, 1937 |
| 2,381,925 | Pincus | Aug. 14, 1945 |
| 2,398,530 | Hooley | Apr. 16, 1946 |
| 2,423,128 | Tillyer | July 1, 1947 |
| 2,518,194 | Silverman et al. | Aug. 8, 1950 |
| 2,532,386 | Armistead | Dec. 5, 1950 |
| 2,539,316 | Navarre | Jan. 23, 1951 |
| 2,552,125 | Tillyer | May 8, 1951 |
| 2,748,031 | Kafig | May 29, 1956 |
| 2,758,510 | Auwarter | Aug. 12, 1956 |